United States Patent
Chang et al.

(10) Patent No.: US 7,930,597 B2
(45) Date of Patent: Apr. 19, 2011

(54) METHOD AND APPARATUS FOR VALIDATING SYSTEM PROPERTIES EXHIBITED IN EXECUTION TRACES

(75) Inventors: Fangzhe Chang, Edison, NJ (US); Yangsong Ren, Basking Ridge, NJ (US); Thomas L. Wood, Colts Neck, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 399 days.

(21) Appl. No.: 12/212,758

(22) Filed: Sep. 18, 2008

(65) Prior Publication Data

US 2010/0070805 A1 Mar. 18, 2010

(51) Int. Cl.
*G06F 11/00* (2006.01)

(52) U.S. Cl. ............................. 714/39; 714/45

(58) Field of Classification Search ............... 714/39
See application file for complete search history.

(56) References Cited

U.S. PATENT DOCUMENTS

| | | | | |
|---|---|---|---|---|
| 4,483,002 A * | 11/1984 | Groom et al. | | 714/46 |
| 5,548,719 A * | 8/1996 | DeVane et al. | | 714/39 |
| 6,266,789 B1 * | 7/2001 | Bucher et al. | | 714/39 |
| 7,200,588 B1 * | 4/2007 | Srivastava et al. | | 1/1 |
| 7,836,346 B1 * | 11/2010 | Davidov et al. | | 714/38 |
| 2003/0088853 A1 * | 5/2003 | Iida et al. | | 717/128 |
| 2003/0110419 A1 * | 6/2003 | Banerjee et al. | | 714/43 |
| 2004/0254919 A1 * | 12/2004 | Giuseppini | | 707/3 |
| 2005/0028157 A1 * | 2/2005 | Betancourt et al. | | 718/100 |
| 2006/0129871 A1 * | 6/2006 | Smith | | 714/2 |
| 2006/0184529 A1 * | 8/2006 | Berg et al. | | 707/8 |

* cited by examiner

*Primary Examiner* — Gabriel L Chu (74) *Attorney, Agent, or Firm* — Wall & Tong, LLP (57) ABSTRACT

The invention includes a method and apparatus for validating system properties exhibited in execution traces. In one embodiment, a method for testing a system under test (SUT) includes determining a system testing result for the SUT using at least one structured term generated by monitoring an execution trace of the SUT using at least one parameterized pattern. A test procedure is executed for the SUT. The test procedure has at least one parameterized pattern associated therewith. An execution trace generated during execution of the test procedure is parsed, where the execution trace includes unstructured information and the execution trace is parsed using the at least one parameterized pattern to identify at least one matching pattern. A system testing result for the SUT is determined using at least one structured term that is generated using the at least one matching pattern. In this manner, behavior of the system under test during the test procedure may be validated.

21 Claims, 5 Drawing Sheets

METHOD AND APPARATUS FOR VALIDATING SYSTEM PROPERTIES EXHIBITED IN EXECUTION TRACES

FIELD OF THE INVENTION

The invention relates to the field of system testing and, more specifically, to analysis of execution traces during system testing.

BACKGROUND OF THE INVENTION

In many industries, such as the telecommunications industry, system testing of a product is an important stage in the product development cycle. System testing verifies whether or not a product complies with requirements established for the operation of the product and, thus, if performed properly, ensures high quality of the product. An execution trace is produced by a product during execution of system testing to capture runtime information associated with system testing. Disadvantageously, however, while execution traces may be valuable sources of information for validating product behavior, thorough analysis of such execution traces is not typically performed due to the enormous effort typically required by system testers to analyze execution traces.

SUMMARY OF THE INVENTION

Various deficiencies in the prior art are addressed by a method and apparatus for validating system properties exhibited in execution traces. In one embodiment, a method for testing a system under test (SUT) includes determining a system testing result for the SUT using at least one structured term generated by monitoring an execution trace of the SUT using at least one parameterized pattern. A test procedure is executed for the SUT. The test procedure has at least one parameterized pattern associated therewith. An execution trace generated during execution of the test procedure is monitored, where the execution trace includes unstructured information and the execution trace is monitored using the at least one parameterized pattern to identify at least one matching pattern. A system testing result for the SUT is determined using at least one structured term that is generated using the at least one matching pattern. In this manner, behavior of the system under test during the test procedure may be validated.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A parameterized execution trace analysis capability is provided. The parameterized execution trace analysis capability is provided using the parameterized execution trace analysis functions depicted and described herein. The parameterized execution trace analysis functions enable improved system testing by supporting automated monitoring and analysis of execution traces resulting from execution of system testing on a system under test. In this manner, more software defects will be identified and corrected prior to delivery of products to customers, thereby providing customers with higher quality products.

The parameterized execution trace analysis functions enable improved system testing by converting unstructured execution trace information into structured execution trace information which may be utilized during system testing, thereby improving system testing capabilities. The unstructured execution trace information may include information from static execution traces and/or dynamic execution traces. The parameterized execution trace analysis functions enable extraction of significant portions of execution traces, while ignoring insignificant portions of execution traces. The structured execution trace information is represented using structured terms, which include structured representations of unstructured execution trace information (e.g., formats of single data items, organization of multiple data items into holistic logical units, and the like).

The parameterized execution trace analysis functions bridge the gap between unorganized execution traces of a system under test and behavioral properties of a system under test within the system testing stage of the product development lifecycle. The parameterized execution trace analysis functions enable validation of system behavioral properties in real time, thereby resulting in improved thoroughness of system behavioral analysis and improved identification of defects prior to system release. The parameterized execution trace analysis functions enable evaluation of comprehensive behavioral properties of a system under test using structured terms. The parameterized execution trace analysis functions obviate the need for system testers to write additional testing scripts to mix test logic with operations adapted for handling the particularity of data items in unstructured execution trace information.

Although primarily depicted and described herein within the context of performing system testing of a telecommunications system, the parameterized execution trace analysis functions depicted and described herein may be applied in performing system testing for any system producing execution traces during system testing.

Figure 1:
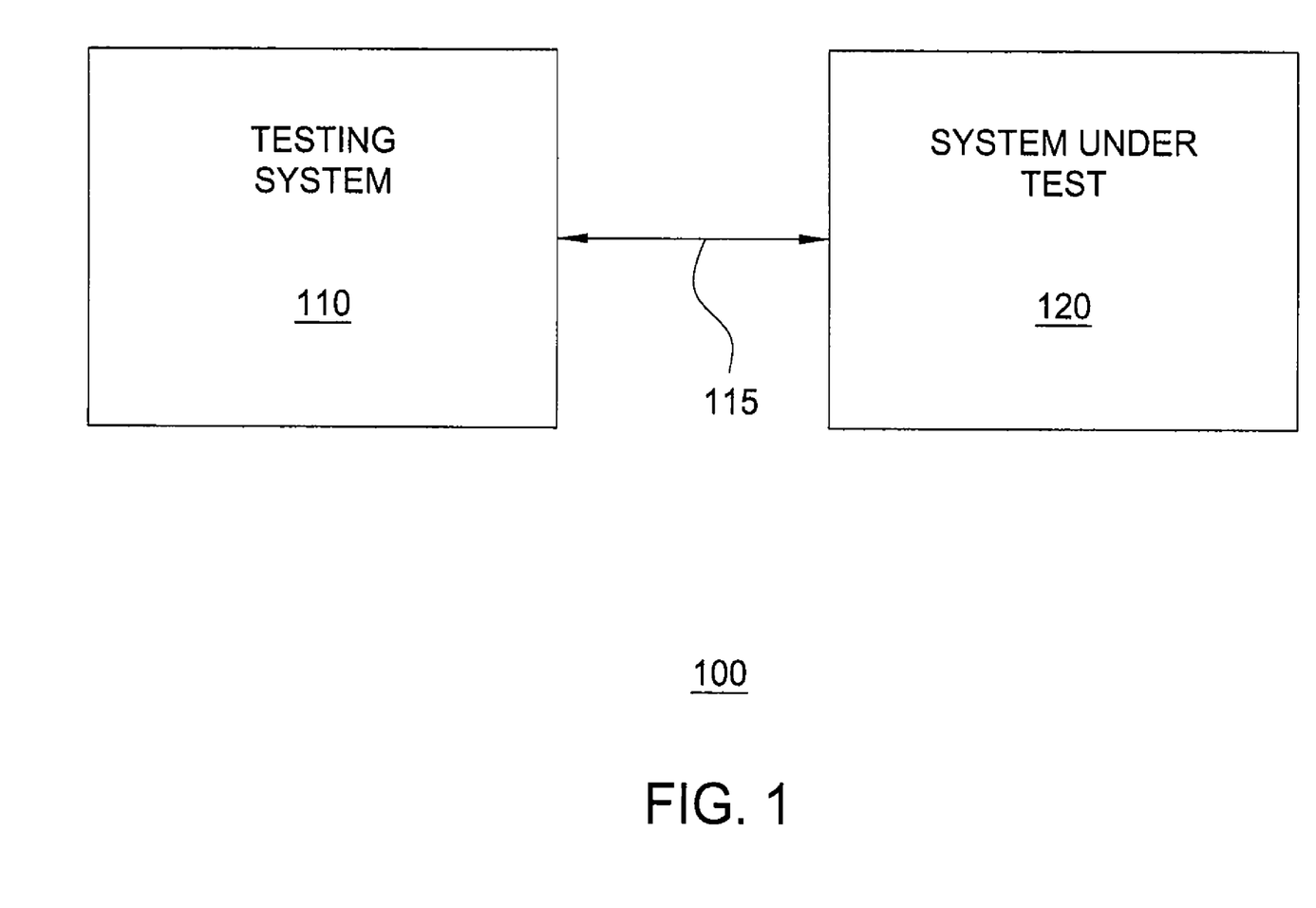
FIG. 1 depicts a high-level block diagram of a system testing environment.

FIG. 1 depicts a high-level block diagram of a system testing environment. Specifically, system testing environment 100 includes a testing system (TS) 110 and a system under test (SUT) 120 in communication via a communication path (CP) 115. The TS 110 may be any system adapted for performing system testing of other systems. The SUT 120 may be any system capable of being tested by a testing system. The CP 115 may be any means of communication between TS 110 and SUT 120. For example, CP 115 may include a direct communication path between TS 110 and SUT 120, an indirect communication path between TS 110 and SUT 120 (e.g., via one or more networks), and the like, as well as various combinations thereof.

The TS 110 is adapted for performing system testing of SUT 120. The TS 110 performs system testing of the SUT 120 according to a testing plan. A test plan typically includes one or more test cases designed to test one or more functions of SUT 120. A test plan and associated test cases are typically defined by system testers based on the function(s) of the SUT 120 for which testing is required. A test case defines one or more test procedures to be executed in order to perform the test case. A test case may include other information which may be associated with system testing, such as the configuration of the testing environment required for performing the test case, the output data handling for the test case (e.g., logging, error triggering, recovery actions, and so forth), the estimated time required for completing the test case, the like, as well as various combinations thereof.

The TS 110 performs system testing of the SUT 120 by executing test procedures defined for test cases of the testing plan. The TS 110 initiates a test procedure for SUT 120. The TS 110 generates input information for the test procedure. The input information may include commands, data, and the like, as well as various combinations thereof. The TS 110 provides the input information to SUT 120. The SUT 120 receives the input information from TS 110. The SUT 120 operates according to the received input information (e.g., executing various functions as specified by the received input information). The SUT 120 produces output information for the test procedure. The output information may include information which may result from operation of SUT 120 during execution of the test procedure. The SUT 120 provides the output information to TS 110. The TS 110 receives the output information. The TS 110 uses the output information to determine the results of the test procedure (e.g., whether the test succeeded or failed).

The SUT 120 operates according to the test procedures executed by TS 110. As SUT 120 operates during the execution of the test procedure, SUT 120 produces execution traces. The execution traces include information associated with the operation of SUT 120 during the execution of the test procedures. The execution traces supplement the input information provided to SUT 120 and the output information received from SUT 120 for execution of the test procedure. As described herein, an execution trace produced by SUT 120 for a test procedure includes unstructured execution trace information produced by SUT 120. The TS 110 processes the unstructured execution trace information, using parameterized execution trace analysis functions, to produce structured execution trace information in the form of structured terms. The TS 110 utilizes the structured execution trace information to perform additional system testing.

Figure 2:
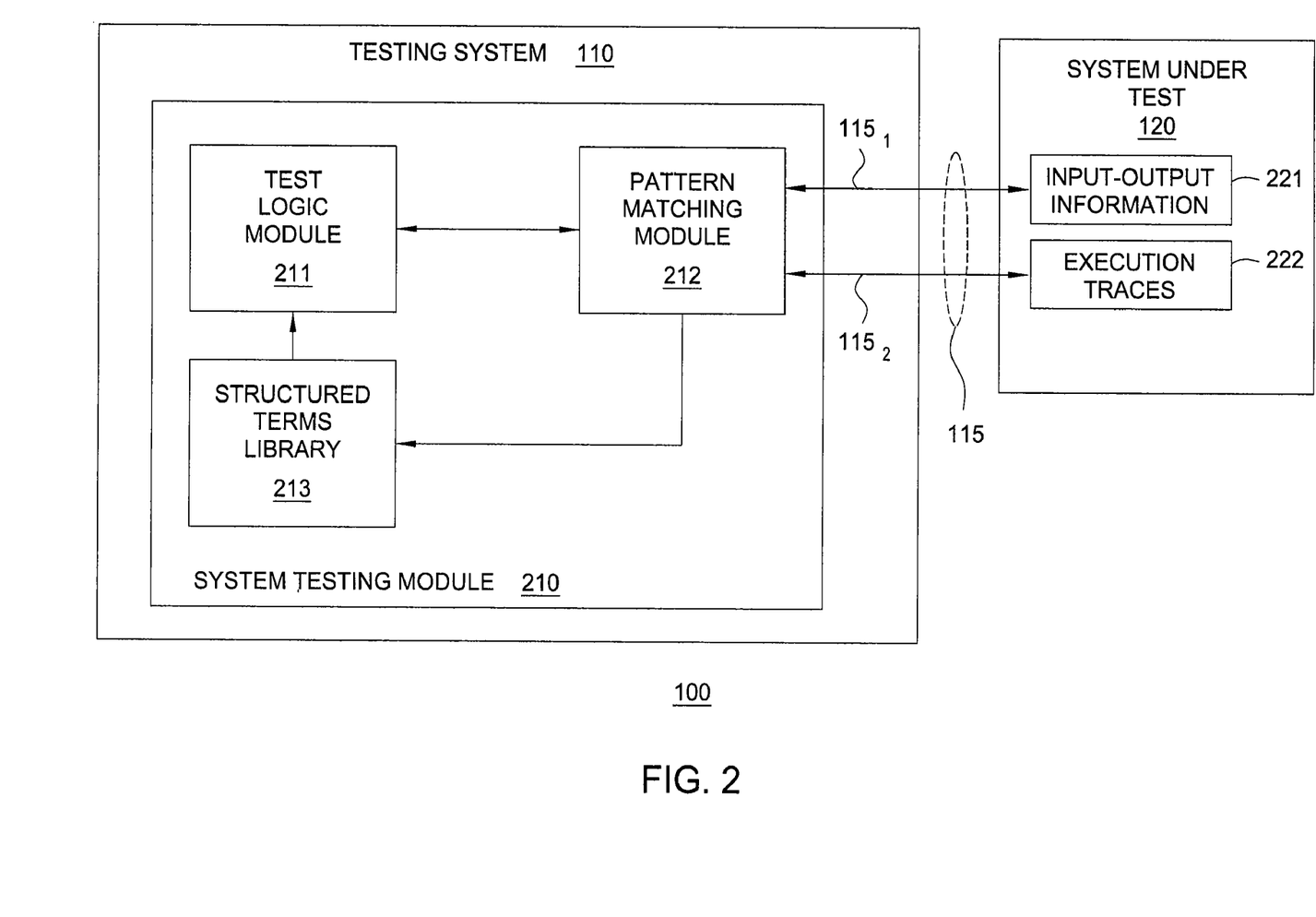
FIG. 2 depicts a high-level block diagram of the system testing environment of FIG. 1 illustrating the system testing module of the testing system.
Figure 3:
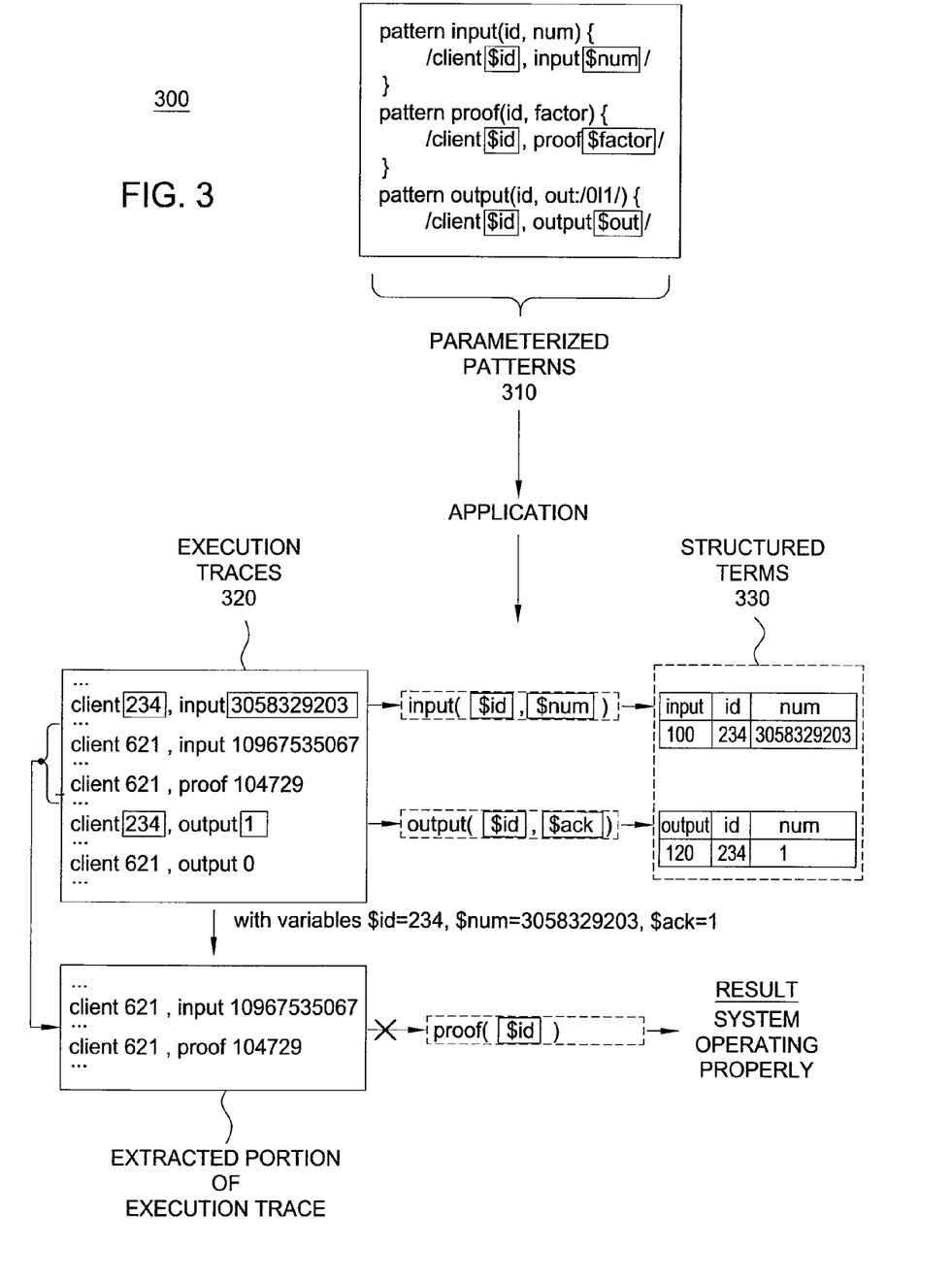
FIG. 3 depicts an exemplary system test which may be performed within the system testing environment of FIG. 1 using parameterized execution trace analysis functions.
Figure 4:
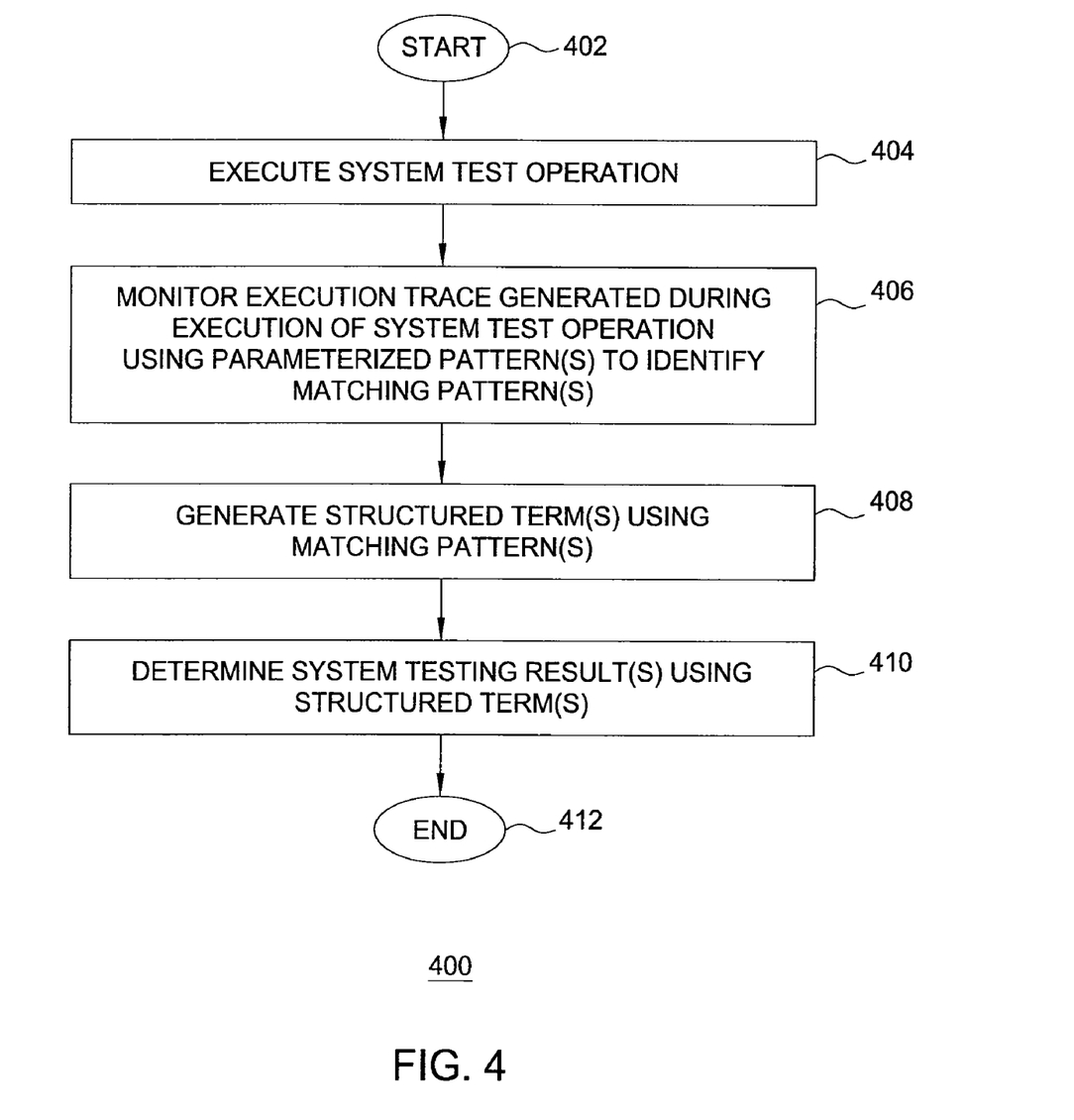
FIG. 4 depicts a method for validating system properties of a system exhibited in execution traces generated by the system during system testing of the system.

The parameterized execution trace analysis functions supported by TS 110, which enhance the system test capabilities of TS 110, may be better understood with respect to FIG. 2-FIG. 4.

FIG. 2 depicts a high-level block diagram of the system testing environment of FIG. 1 illustrating a system testing module of the testing system. As depicted in FIG. 2, TS 110 includes a system testing module 210. The system testing module 210 includes a test logic module 211, a pattern matching module 212, and structured terms library 213. As depicted in FIG. 2, test logic module 211 is coupled to pattern matching module 212 and structured terms library 213 for performing system testing functions described herein, and pattern matching module 212 is coupled to structured terms library 213 for maintaining structured terms produced from performing parameterized execution trace analysis functions. The system testing module 210 executes test procedures for testing SUT 120. A description of the operation of system testing module 210 during execution of a test procedure for testing SUT 120 follows.

The test logic module 211 detects initiation of a test procedure for testing SUT 120. The initiation of the test procedure may be manual or automatic. The test logic module 211 compiles and executes code for the test procedure. The test logic module 211 produces input information to be applied to SUT 120 (e.g., produced when the code is compiled). The input information may include commands, data, and the like, as well as various combinations thereof. The input information may be represented as one or more input testing vectors, or in any other format adapted for being applied from TS 110 to SUT 120. The test logic module 211 applies the input information to SUT 120 via one or more input-output communication paths (illustratively, CP $115_1$). As depicted in FIG. 2, pattern matching module 212 may perform pattern matching on the input information applied to SUT 120 via CP $115_1$ using one or more parameterized patterns associated with the test procedure. If pattern matching module 212 identifies one or more matching patterns in the input information, pattern matching module 212 may generate one or more corresponding structured terms to be stored in structured terms library 213.

The SUT 120 receives the input information from test logic module 211 of TS 110. The SUT 120 operates according to the received input information, which may include operations internal to SUT 120 and, optionally, operations requiring interaction between SUT 120 and one or more other systems (omitted for purposes of clarity). The SUT 120 produces output information for the test procedure. The output information may include any information which may be output in response to execution of a test procedure. The output information may be represented as one or more output testing vectors, or in any other format adapted for being provided from SUT 120 to TS 110 for analysis. The SUT 120 provides the output information to TS 110 via one or more input-output communication paths (illustratively, CP $115_1$). As depicted in FIG. 2, pattern matching module 212 may perform pattern matching on the output information received from SUT 120 via CP $115_1$ using one or more parameterized patterns associated with the test procedure. If pattern matching module 212 identifies one or more matching patterns in the output information, pattern matching module 212 may generate one or more corresponding structured terms to be stored in structured terms library 213.

The input information received by SUT 120 and output information provided by SUT 120 are represented as input-output information 221 on SUT 120.

As depicted in FIG. 2, the output information from SUT 120 is available to test logic module 211. The test logic module 211 may perform analysis of the output information in order to determine the results of the test procedure. For example, during generation of the input information by test logic module 211, test logic module 211 may also generate expected output information that is expected from SUT 120 in response to execution of the test case. The test logic module 211 may then compare the actual output information received from SUT 120 to the expected output information generated by test logic module 211 in order to determine the results of the test procedure. In one embodiment, at least a portion of the structured terms generated by pattern matching module 212 during execution of the test case may be used by testing logic module to determine the results of the test procedure.

The operation of SUT 120 during execution of the test procedure results in generation of execution traces on SUT 120 (illustratively, execution traces 222). The execution traces 222 include unstructured execution trace information indicative of the operation of SUT 120 during execution of the test procedure initiated by TS 110 for execution on SUT 120. The execution traces 222 are available to TS 110 via CP $115_2$ (which is representative of one or more interfaces by which execution traces 222 may be accessed by system testing module 210 of TS 110). For example, TS 110 may access execution traces 222 from interfaces such as testing data input/output interfaces, log files, databases, terminals (e.g., UNIX, proprietary, and the like), secure shells, command-line-interfaces, and/or other interfaces of SUT 120.

As depicted in FIG. 2, pattern matching module 212 performs pattern matching on the execution trace information available from SUT 120 via CP $115_2$ using one or more parameterized patterns associated with the test procedure. The pattern matching module 212, in response to identifying one or more matching patterns in the unstructured execution trace information, generates corresponding structured execution trace information to be stored in structured terms library 213.

The unstructured execution trace information may be represented in any unstructured format, which may depend, at least in part, on the type of interface from which the unstructured execution trace information is obtained. The structured execution trace information, in the form of one or more structured terms which are essentially high-level abstractions of input and output activities at one or more interfaces of SUT 120, may be represented in any structured format.

The operation of pattern matching module 212 in performing pattern matching on the unstructured execution trace information to generate structured execution trace information is described in detail hereinbelow.

As depicted in FIG. 2, the execution trace information from SUT 120 is available to test logic module 211. The test logic module 211 may determine system testing results (e.g., determine the results of the test procedure, perform additional testing to verify the operational behavior of SUT 120, and the like) using the pattern matching results. For example, test logic module 211 may perform additional analysis of one or more of the structured terms generated by pattern matching module 212 during execution of the test procedure. For example, test logic module 211 may perform additional analysis of extracted portions of the execution trace information, where the extracted portion of the execution trace information are extracted using one or more of the structured terms generated by pattern matching module 212 during execution of the test case, and analysis of the extracted portions of the execution trace information is performed using one or more parameterized patterns. The testing performed by test logic module 211 using structured terms is described in additional detail hereinbelow.

The pattern matching module 212 performs pattern matching using one or more parameterized patterns. The pattern matching module 212 utilizes parameterized patterns to convert unstructured execution trace information into structured execution trace information. The pattern matching module 212 converts unstructured execution trace information to structured execution trace information by applying one or more parameterized patterns to the unstructured execution trace information. The pattern matching module 212 applies one or more parameterized patterns to unstructured execution trace information on one or more interfaces on which the unstructured execution trace information is available.

A parameterized pattern is defined using a pattern template and one or more pattern parameters. A parameterized pattern also may be defined using one or more operators (e.g., logical, temporal, and the like). A parameterized pattern also may be defined using one or more pattern intervals. A parameterized pattern may be defined using various other types of constructs. A parameterized pattern also may be composed of one or more other parameterized patterns (i.e., nesting of one or more parameterized patterns within the parameterized pattern, which may include a combination(s) of parameterized patterns using different operators (e.g., logical, temporal, and the like)).

A pattern template includes one or more data fields and a format expected for the one or more data fields. A data field is given a parameter name and a parameter type definition. The parameter type definition specifies the type of data which may be associated with the data field. For example, the parameter type definition may specify a sequence of non-whitespace characters, text matching a particular expression, nested entries matching one or more other parameterized patterns, and the like, as well as various combinations thereof.

In other words, more intuitively, a pattern template may be thought of as a piece of cardboard having holes cut out where important data fields are expected. The holes correspond to the data fields defined for the pattern template. The piece of cardboard is then laid over the execution trace until the expected data appears in the holes in the piece of cardboard, indicating that the desired pattern defined by the piece of cardboard has been identified in the execution trace.

A pattern parameter may be a basic data item, a sequence or combination of data items, one or more other parameterized patterns, and the like, as well as various combinations thereof.

A pattern interval may be a static pattern interval or a dynamic pattern interval.

A static pattern interval is used to explicitly specify a beginning boundary condition (B) and an ending boundary condition (E) between which a pattern (P) is expected to occur. A static pattern interval may be expressed as: <B→E: P>. A static pattern interval may be applied to an execution trace in order to extract a portion of the execution trace, thereby enabling more efficient and thorough analysis of the extracted portion of the execution trace. The well-defined boundaries of a static pattern interval allow evaluation of both positive and negative constraints.

A dynamic pattern interval (which may also be referred to as a sliding pattern interval) indicates that eventually there is an interval, beginning with a beginning boundary condition (B) and ending with an ending boundary condition (E) during which a pattern (P) holds. A dynamic pattern interval may be expressed as: <B→E: P>.

Using dynamic pattern intervals, system testers may specify the manner in which stableness of execution traces is determined with regard to specific properties of the system under test. This may be seen from the following example. For example, the ending condition <?eof→{delay (300); eof}: !P> specifies that the system is no longer actively performing operations whose log entries match P (where checking is performed every 300 seconds).

Using dynamic pattern intervals, system testers may automatically associate one or more time-out settings with each pattern and pattern interval evaluation. This may be seen from the following example. For example, in "P in (600, 300)", matching of pattern P is terminated when no additional log entries are produced in a 300 second period or when no pattern matching has occurred in 600 seconds, whichever is earlier.

This explicit, fine-grained control of ending boundaries of a dynamic pattern interval allows evaluation of liveness properties (e.g., properties that indicate that some "good things" will happen eventually). As an example, one liveness property which may be tested using pattern intervals for a high-availability system is that, after a fault, all processes will eventually recover even though new faults may occur during recovery.

As described herein, parameterized patterns may be composed of one or more pattern intervals and, similarly, a pattern interval may be composed of one or more parameterized pattern.

For example, a parameterized pattern composed of multiple parameterized patterns may include searching for a specific pattern of parameterized patterns (e.g., we expect to identify "pattern 1" once, then identify "pattern 2" four times, then identify "pattern 7" twice, and then identify "pattern 1" again).

For example, a pattern interval composed of multiple parameterized patterns may include searching for one or more parameterized patterns which constitute a beginning boundary condition for the pattern interval and then searching for one or more parameterized patterns which constitute an ending boundary condition for the pattern interval.

In this manner, various combinations of parameterized patterns and pattern intervals may be defined in a manner that enables flexible pattern searching within execution traces of a system under test and, thus, flexible validation of behavioral properties of the system under test.

The operators supported for parameterized execution trace analysis may include logical connectors, temporal connectors, and the like, as well as various combinations thereof.

The operators supported for parameterized execution trace analysis may include a "tight sequence" operator. A "tight sequence" is one in which two patterns must be adjacent to each other, without any intervening information in between the patterns.

The operators supported for parameterized execution trace analysis may include a "loose sequence" operator. A "loose sequence" is one in which a first pattern(s) must occur before a second pattern(s), but there may be any other information in between the first pattern and the second pattern. The "loose sequence" operator differs from existing test text processing mechanisms at least in that it allows other execution trace information to be interleaved with execution trace information of interest for the system test being performed.

In one embodiment, use of a "loose sequence" operator for finding the next matching pattern ensures multiple characteristics of operation, including: (1) a matching pattern is eventually identified if one exists (where backtracking is used to avoid the side effect of variable unification); (2) where multiple matching patterns are identified, the earliest ending pattern after the current starting (matching) point is selected, where one matching for a k-length sequence (e.g., a[0], a[1], . . . , a[k−1]) is earlier than another matching (e.g., b[0], b[1], . . . , b[k−1]) if and only if there is an integer "s" (0<=s<k) such that a[s] ends earlier than b[s] and a[i] ends at the same place as b[i] for all such [i]'s in the integer interval (s,k).

The operators supported for parameterized execution trace analysis may include Boolean operators, such as Boolean "and" (&), Boolean "or" (|), Boolean "not" (!), and the like, as well as various combinations thereof.

The operators supported for parameterized execution trace analysis may include various other operators, such as a universal quantifier ("for all"), an existential quantifier ("existed"), and the like, as well as various combinations thereof.

A test case defined to test a system may be defined using one or more parameterized patterns, and, thus, a test procedure executed by TS 110 to perform system testing of SUT 120 for a test case may be defined using one or more parameterized patterns.

The parameterized patterns are defined by one or more system testers. The parameterized patterns may be defined by system testers based on expected format(s) of execution trace information for the system under test. The parameterized patterns enable system testers to focus on describing logical test steps and associated test data dependencies without concerns regarding operational details of such interfaces (e.g., without specifying, operationally, the manner in which execution traces should be parsed). A test procedure may then be defined by system testers using one or more of the parameterized patterns. In this manner, parameterized patterns function as building blocks for test logic.

For example, system testing of a system may be performed using X number of test cases sharing Y number of parameterized patterns.

The pattern matching module 212 generates one or more structured terms using one or more matching patterns identified by parsing execution traces 222 using one or more parameterized patterns.

The pattern matching module 212 may generate a structured term from a matching pattern many ways. In one embodiment, for example, pattern matching module 212 generates a structured term from a matching pattern by identifying, for each pattern parameter defined by the parameterized pattern, a corresponding data value in the unstructured execution trace information, extracting each identified data value from the execution trace, and organizing the extracted data values using a structured format. In another embodiment, for example, pattern matching module 212 generates a structured term from a matching pattern by extracting each data value of a data record in the unstructured execution trace information on which the parameterized pattern was matched.

A structured term is generated using unstructured execution trace information identified using one or more parameterized patterns. A structured term may include any of the unstructured execution trace information associated with a matching pattern identified via the one or more parameterized patterns. A structured term also may include, or have associated therewith, other information, such a location within the execution trace at which the matching pattern was identified, one or more parameters describing the manner in which the matching pattern was identified, and the like, as well as various combinations thereof.

The pattern matching module 212 provides generated structured terms to structured terms library 213, where the structured terms may be stored for later use.

The TS 110 (e.g., test logic module 211 and/or one or more other modules of components of or in communication with TS 110) determines a system test result using one or more structured terms. The system testing result determined by TS 110 may be a validation of the system behavior of SUT 120 during execution of the current test procedure during which the one or more structured terms were generated, execution of one or more additional test procedures using one or more structured terms generated during execution of one or more previous test procedures, and the like, as well as various combinations thereof.

In one embodiment, TS 110 may determine a system testing result for SUT 120 (e.g., validate system behavior of SUT 120) by analyzing one or more structured terms. In such an embodiment, TS 110 may parse execution traces 222 one or more times using one or more parameterized patterns and, optionally, one or more pattern intervals, in order to locate specific information within the execution traces and generate one or more structured terms from the specific information.

The TS 110 may then perform some processing on the structured terms without any additional parsing of execution traces 222.

In one embodiment, TS 110 may determine a system testing result for SUT 120 (e.g., validate system behavior of SUT 120) by applying one or more parameterized patterns to one or more portions of the unstructured execution trace information, where the one or more portions of the unstructured execution trace information are identified and extracted using one or more structured terms. In such an embodiment, TS 110 may identify and extract one or more portions of the unstructured execution trace information of execution traces 222 by parsing the unstructured execution trace information using one or more structured terms, and then perform additional processing on the extracted portion(s) of the unstructured execution trace information using one or more parameterized patterns and/or one or more structured terms. In this manner, TS 110 may make multiple passes through one or more portions of the unstructured execution trace information of execution traces 222 in order to determine a system testing result for SUT 120.

The TS 110 may determine a system testing result for SUT 120 by using one or more structured terms and/or one or more parameterized patterns, and, optionally, other processing constructs and capabilities, in various other ways.

In order to better illustrate use of the parameterized execution trace analysis functions depicted and described herein, an example of system testing which may be performed using the parameterized execution trace analysis functions follows.

FIG. 3 depicts an exemplary system test which may be performed within the system testing environment of FIG. 1 using parameterized execution trace analysis functions.

As an example of system testing which may be performed using the parameterized execution trace analysis functions depicted and described herein, consider a pseudo-system where, in response to a request from a client device, a server computes whether or not an integer is a prime number and responds to the requesting client with the results of the determination (e.g., responding with a "0" if the integer is not prime and a "1" if the integer is prime). In this example, assume that the server maintains a log in which it records its activities. In this example, the server records multiple entries in the log for each client request, including: (1) when the server receives a request from a client, the server records the request (e.g., recording a client identifier of the client and the request); (2) when the server determines that an integer is not prime it records proof in the form of one of its factors; and (3) when the server sends a response to the client, the server records the response (e.g., recording a client identifier of the client and the response).

In order to more thoroughly test the operation of the server, analysis of more than the input to the server and output from the server is desirable. Specifically, analysis of the operational behavior of the server in performing the determination as to whether or not an integer is a prime number is desirable; however, performing such analysis has difficulties associated therewith. For example, since the time required to compute the primality of a large integer may be quite large, log entries for different clients may be interleaved within the log (i.e., additional client requests are being received by the server as previously received client requests are still being processed). Similarly, for example, since the time required to compute the primality of large integers may be unpredictable, determining where in the log a response for a particular client may appear is quite difficult. The parameterized execution trace analysis functions depicted and described herein overcome such difficulties associated with performing such an analysis.

In this example, although the log is not strictly structured (e.g., Abstract Syntax Notation One (ASN.1) encoded) or even semi-structured (e.g., Extensible Markup Language (XML) encoded), the formats and organization of the log entries may be captured by applying a parameterized patterns to the log.

As depicted in FIG. 3, the parameterized patterns are represented as parameterized patterns 310, the server log is represented as execution traces 320, and structured terms are represented as structured terms 330.

In this example, the parameterized patterns 310 include three parameterized patterns, denoted as "input", "proof", and "output", which correspond to three different types of log entries in the server log.

The "input" pattern is defined in a manner enabling identification of log entries associated with requests received by the server from clients. The "input" pattern is defined as:

```
pattern input (id, num) {
    /client $id, input $num/
}
```

The "proof" pattern is defined in a manner enabling identification of log entries indicating that the determination of whether or not an integer is a prime number results in a determination that the integer is a prime number. The "proof" pattern is defined as:

```
pattern proof (id, factor) {
    /client $id, proof $factor/ }
```

The "output" pattern is defined in a manner enabling identification of log entries associated with responses provided to clients by the server. The "output" pattern is defined as:

```
pattern output (id, out:/0|1/) {
    /client $id, output $out/ }
```

In this example, the execution traces 320 include log entries of the server log. The execution traces 320 depict log entries associated with two clients (namely, a client having a client identifier of 234 and a client having a client identifier of 621). The execution traces 320 indicate that other log entries are included but have been omitted for purposes of clarity.

In this example, the structured terms 330 are structured using three columns.

The first column includes a meta-matching pointer for the structured term (e.g., the line number of the log entry in the server log at which the pattern was matched), which may be used to identify and access that point in the execution trace (e.g., on subsequent passes through the execution trace).

The second column includes a client identifier which identifies the client for which the log entry was added to the server log.

The third column includes a number associated with the log entry, which varies depending on the type of parameterized pattern for which the structured term was generated (e.g., for the "input" pattern, the number is the integer for which the primality check is to be performed; for the "proof" pattern, the number is the factor computed in the primality check; for the "output" pattern, the number is the result of the primality check ("0" or "1")).

Although primarily depicted and described herein with respect to an embodiment in which a specific number of columns are used to format structure terms, it will be appreciated that structured terms may be structured in many ways (e.g., using other numbers of columns, using a different organization of columns, using different types of formatting capable of structuring unstructured data, and the like, as well as various combinations thereof).

The parameterized patterns 310 are applied to execution traces 320 such that, upon identification of a log entry of execution traces 320 that corresponds to one of the parameterized patterns 310, a corresponding structured term 330 is generated, thereby converting unstructured execution trace information into corresponding structured execution trace information.

For example, matching of the pattern "input($id, $num)" with the log entry "client 234, input 3058329203" in execution traces 320 results in translation of the log entry into a corresponding structured term (100, 234, 3058329203) which is stored in a structured terms table. In this structured term, the variables "$id" and "$num" have associated extracted values of "234" and "3058329203", respectively, and the internal meta-matching pointer value "100" identifies the matching location in the server log at which the pattern was matched. The internal meta-matching pointer value may be used later to access the temporal relation, including that of pattern interval constructs.

For example, matching of the pattern "output($id, $ack)" with the log entry "client 234, output 1" in execution traces 320 results in translation of the log entry into a corresponding structured term (120, 234, 1) which is stored in a structured terms table. In this structured term, the variables "$id" and "$ack" have associated extracted values of "234" and "1", respectively, and the internal meta-matching pointer value "120" identifies the matching location in the server log at which the pattern was matched. The internal meta-matching pointer value may be used later to access the temporal relation, including that of pattern interval constructs.

In this example, a static pattern interval is used to determine whether or not the server properly responded to client 234 regarding the request by client 234 for the server to determine whether or not the integer "3058329203" is a prime number. In this example, the following parameterized pattern may be used for checking for prime integers over execution trace information: "<input($id, $num)→output($id, $ack): !proof($id)>", which reads: between the server log entry "input($id, $num)" and the server log entry "output($id, $ack)", there should be no server log entry that matches "proof($id)". In this example, use of the variable "$id" ensures that pattern matching only will match server log entries from a given client.

In this example, application of this parameterized pattern to execution traces 320 results in a matching of the two boundary patterns, thereby resulting in a variable mapping (i.e., ($id=234, $num=3058329203, $ack=1)). The portion of execution traces 320 between the two boundary patterns is extracted from execution traces 320. The parameterized pattern is then applied to the extracted portion of execution traces 320 to verify that the pattern "proof(234)" does not appear in the extracted portion of execution traces 320. In this example, the pattern "proof(234)" should not appear in the extracted portion of execution traces 320 because the integer for which primality is checked is a prime number (as indicated by the output of "1" provided from the server to client 234) and, thus, there should not be any factor recorded in the server log for that integer for that client. In this example, application of this parameterized pattern to execution traces 320 is performed twice (i.e., the first pass is to identify a portion of execution traces 320 to be further analyzed, and the second pass is to further analyze the portion of execution traces 320 for presence of the "proof" pattern).

The parameterized execution trace analysis functions depicted and described with respect to the specific example of FIG. 3 may be generalized as depicted and described with respect to the method of FIG. 4.

FIG. 4 depicts a method according to one embodiment of the present invention. Specifically, method 400 of FIG. 4 includes a method for validating system properties of a system exhibited in execution traces generated by the system during system testing of the system. Although depicted and described as being performed serially, at least a portion of the steps of method 400 may be performed contemporaneously, or in a different order than depicted and described with respect to FIG. 4. The method 400 begins at step 402 and proceeds to step 404.

At step 404, a test procedure is executed. The test procedure is executed by a testing system to perform testing of a system under test.

At step 406, pattern matching is performed on execution traces of the test procedure using one or more parameterized patterns. An execution trace generated during execution of the test procedure is parsed using one or more parameterized patterns to identify one or more matching patterns. The execution trace may be parsed online (e.g., where the execution trace is monitored during execution of the test procedure on the system under test) and/or offline (e.g., where the execution trace is parsed following completion of execution of the test procedure on the system under test).

At step 408, one or more structure terms is generated using the one or more matching patterns.

At step 410, a system test result is determined for the system under test using the structured term(s).

At step 412, method 400 ends.

Although depicted and described as ending (for purposes of clarity), it will be appreciated that some or all of the steps of method 400 may continue to be repeated to perform additional testing for the current testing procedure, to perform testing for additional testing procedures, to perform additional test cases, and the like, as well as various combinations thereof.

In one embodiment, for example, steps 404-410 may be repeated multiple times, such as where one or more applied to a next execution of steps 404-410 may depend on analysis of results from one or more previous executions of steps 404-410.

The parameterized execution trace analysis functions depicted and described herein significantly improve system testing by enabling validation of system runtime behavior exhibited in execution traces, thereby guarding against faulty products more thoroughly.

The parameterized execution trace analysis functions depicted and described herein overcome several technical challenges which have long prevented analysis of execution traces during system testing, including: (1) the unstructured format of execution traces (e.g., the application-specific nature of execution traces, execution trace entries that span multiple lines without any clearly marked boundaries, dependencies among execution trace entries, and the like), (2) the amount of information included within execution traces (e.g., execution traces may include enormous amounts of data, much of which is irrelevant to the particular system property being evaluated, and (3) the dynamic nature of execution traces (e.g., execution traces are dynamic and potentially incomplete at the time of analyzing system behavior such that, while a system behavior is assessed at a specific point in time, execution traces are constantly growing and adding new entries related to the system property being evaluated as the system continues its operation).

The parameterized execution trace analysis functions depicted and described herein enable-precise and logical translation of unstructured execution trace information into corresponding structured execution trace information which may be further analyzed in order to improve system testing results, without limiting the parameterized execution trace analysis functions to any particular system or even system domain.

Although primarily depicted and described herein with respect to using the parameterized execution trace analysis functions for online trace analysis and associated testing, it will be understood that the parameterized execution trace analysis functions may also be used for offline trace analysis and associated testing. For example, the parameterized execution trace analysis functions may be used after the execution traces have been collected from a system under test and the execution of the testing by the testing system on the system under test is complete. In such embodiment, the offline analysis and testing performed using the parameterized execution trace analysis functions may be performed by the testing system that initiated the system testing that caused the execution traces to be generated and/or one or more other systems.

Figure 5:
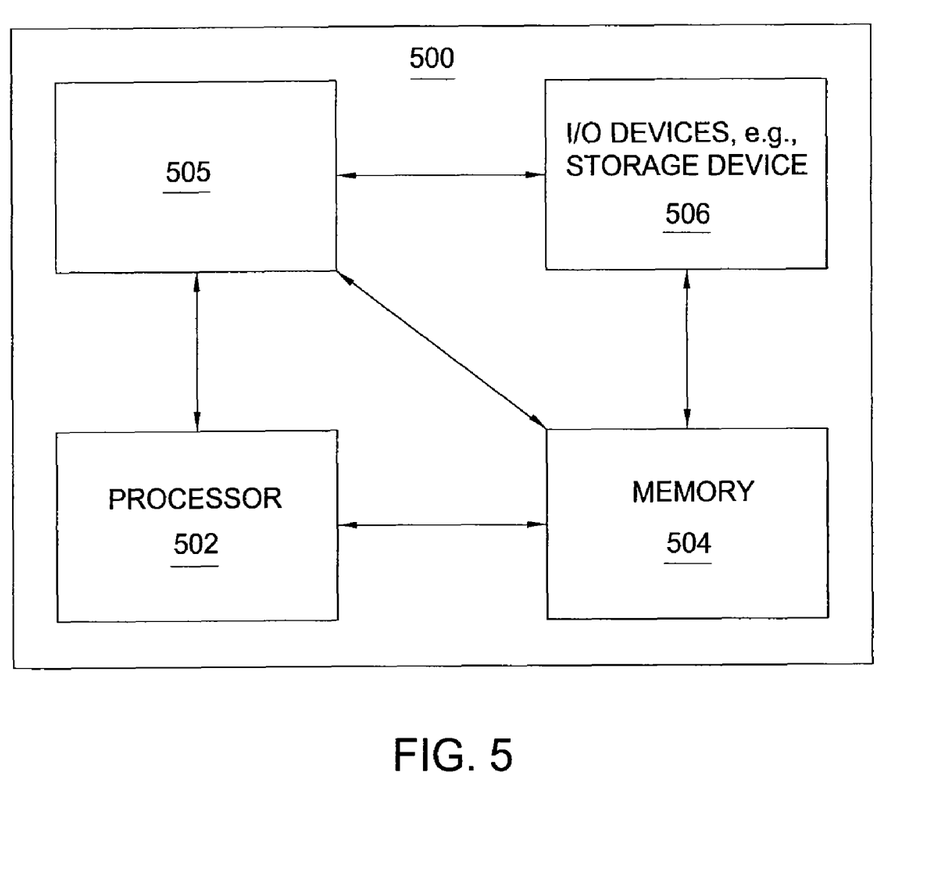
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a system testing module 505 (e.g., system testing module 210 depicted and described with respect to FIG. 2), and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, a speaker, and the like)).

It should be noted that the present invention may be implemented in software and/or in a combination of software and hardware, e.g., using application specific integrated circuits (ASIC), a general purpose computer or any other hardware equivalents. In one embodiment, the system testing process 505 can be loaded into memory 504 and executed by processor 502 to implement the functions as discussed hereinabove. As such, system testing process 505 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a datastream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for testing a system under test, comprising:
   executing a test procedure for the system under test, wherein the test procedure has at least one parameterized pattern associated therewith;
   monitoring an execution trace generated during execution of the test procedure, wherein the execution trace comprises unstructured information, wherein the execution trace is monitored using the at least one parameterized pattern to identify at least one matching pattern;
   generating at least one structured term using the at least one matching pattern; and
   determining a system testing result for the system under test using the at least one structured term.

2. The method of claim 1, wherein each of the at least one parameterized pattern is defined using a pattern template and at least one pattern parameter.

3. The method of claim 2, wherein, for each of the at least one parameterized pattern, the pattern template defines an expected data format and each of the at least one pattern parameter defines an expected data type.

4. The method of claim 1, wherein monitoring the execution trace comprises:
   monitoring the execution trace on at least one interface of the system under test, wherein the at least one interface comprises at least one of an input interface, an output interface, a log file, a database, a terminal, a secure shell, and a command-line-interface.

5. The method of claim 1, wherein monitoring the execution trace comprises:
   parsing the execution trace after completion of execution of the test procedure on the system under test and transfer of the execution trace from the system under test to another system.

6. The method of claim 1, wherein monitoring the execution trace using the at least one parameterized pattern comprises:
   parsing the unstructured information of the execution trace to identify information matching at least one pattern template of the at least one parameterized pattern.

7. The method of claim 1, wherein the execution trace is monitored using at least one of a static pattern interval and a dynamic pattern interval.

8. The method of claim 7, wherein:
   a static pattern interval specifies a beginning boundary condition (B) and an ending boundary condition (E) between which a pattern (P) is expected to occur; and
   a dynamic pattern interval indicates that eventually there is an interval, beginning with a beginning boundary condition (B) and ending with an ending boundary condition (E), during which a pattern (P) holds.

9. The method of claim 1, wherein the execution trace is monitored using at least one of a tight sequence operator and a loose sequence operator.

10. The method of claim 9, wherein:
    a tight sequence operator is adapted for identifying a sequence of data in which two patterns must be adjacent to each other; and
    a loose sequence operator is adapted for identifying a sequence of data in which a first pattern must occur before a second pattern.

11. The method of claim 1, wherein generating a structured term using a matching pattern identified from a parameterized pattern comprises:

identifying, for each pattern parameter defined by the parameterized pattern, a corresponding data value in the unstructured information of the execution trace;

extracting each identified data value from the execution trace; and organizing the extracted data values using a structured format.

12. The method of claim 11, further comprising:

determining a location within the execution trace at which the matching pattern is identified; and associating the location of the matching pattern with the structured term.

13. The method of claim 1, wherein determining a system test result using the at least one structured term comprises:

initiating at least one additional test procedure on the system under test using the at least one structured term.

14. The method of claim 1, wherein determining a system test result using the at least one structured term comprises:

parsing the unstructured information of the execution trace using the at least one structured term to identify thereby a portion of the unstructured information of the execution trace.

15. The method of claim 14, wherein parsing the unstructured information of the execution trace using the at least one structured term to identify thereby a portion of the unstructured information of the execution trace comprises:

parsing the execution trace to identify a beginning boundary condition of the parameterized pattern and an ending boundary condition of the parameterized pattern.

16. The method of claim 14, further comprising:

determining whether the identified portion of the unstructured information of the execution trace satisfies at least one condition.

17. The method of claim 16, wherein determining whether the identified portion of the unstructured information of the execution trace satisfies at least one condition comprises:

parsing the identified portion of the unstructured information of the execution trace using at least one other parameterized pattern.

18. The method of claim 1, further comprising at least one of:

storing the at least one structured term in a structured terms library; and storing the system testing result.

19. An apparatus for testing a system under test, comprising:

means for executing a test procedure for the system under test, wherein the test procedure has at least one parameterized pattern associated therewith;

means for monitoring an execution trace generated during execution of the test procedure, wherein the execution trace comprises unstructured information, wherein the execution trace is monitored using the at least one parameterized pattern to identify at least one matching pattern;

means for generating at least one structured term using the at least one matching pattern; and means for determining a system testing result for the system under test using the at least one structured term.

20. A computer-readable medium storing a software program which, when executed by a computer, causes the computer to perform a method for testing a system under test, the method comprising:

executing a test procedure for the system under test, wherein the test procedure has at least one parameterized pattern associated therewith;

monitor an execution trace generated during execution of the test procedure, wherein the execution trace comprises unstructured information, wherein the execution trace is monitored using the at least one parameterized pattern to identify at least one matching pattern;

generating at least one structured term using the at least one matching pattern; and determining a system testing result for the system under test using the at least one structured term.

21. A method for testing a system under test, comprising:

parsing an execution trace generated during execution of a test procedure, wherein the test procedure has at least one parameterized pattern associated therewith, wherein the execution trace comprises unstructured information, wherein the execution trace is parsed using the at least one parameterized pattern to identify at least one matching pattern;

generating at least one structured term using the at least one matching pattern; and determining a system testing result for the system under test using the at least one structured term.

* * * * *